Feb. 15, 1949.  W. J. GIBBS  2,461,638
APPARATUS FOR STORING AND DISPENSING STACKED ARTICLES
Filed Feb. 17, 1945  3 Sheets-Sheet 1
Fig. 6.  Fig. 1.  Fig. 7.
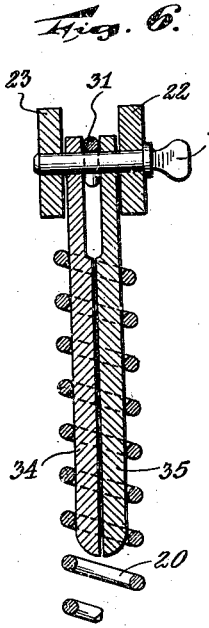
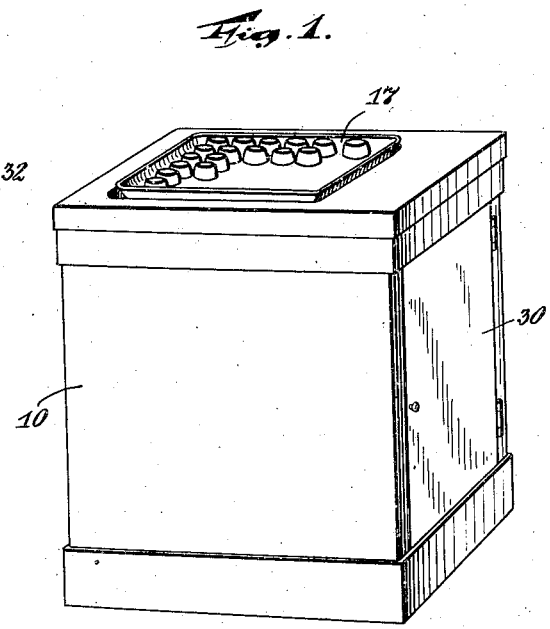
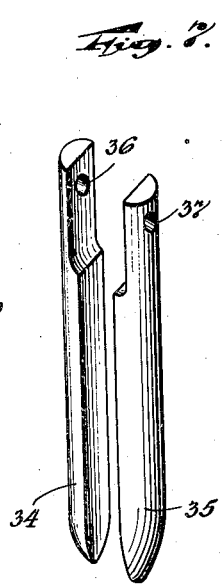
Fig. 8.  Fig. 9.
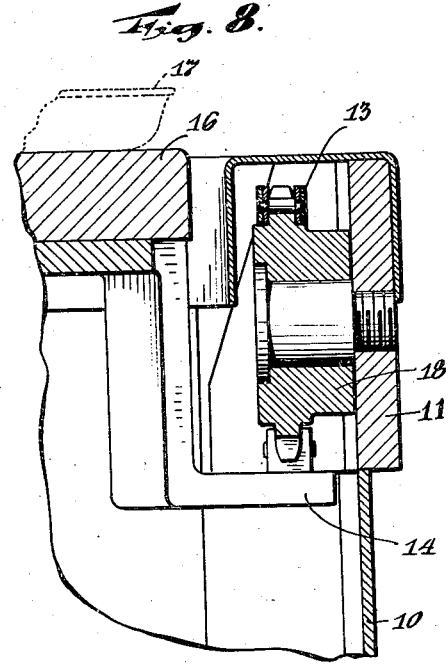
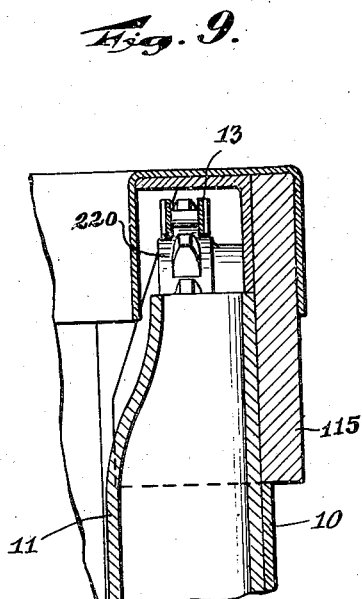
INVENTOR
WILLIAM J. GIBBS
BY Angelo M. Pisarra
ATTORNEY Feb. 15, 1949.  W. J. GIBBS  2,461,638
APPARATUS FOR STORING AND DISPENSING STACKED ARTICLES
Filed Feb. 17, 1945  3 Sheets-Sheet 2
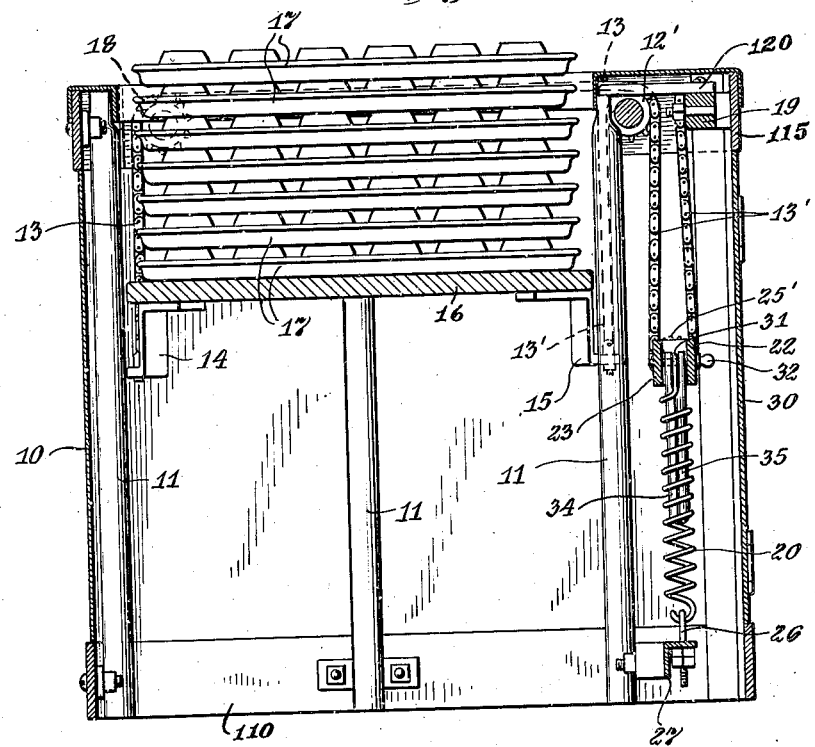
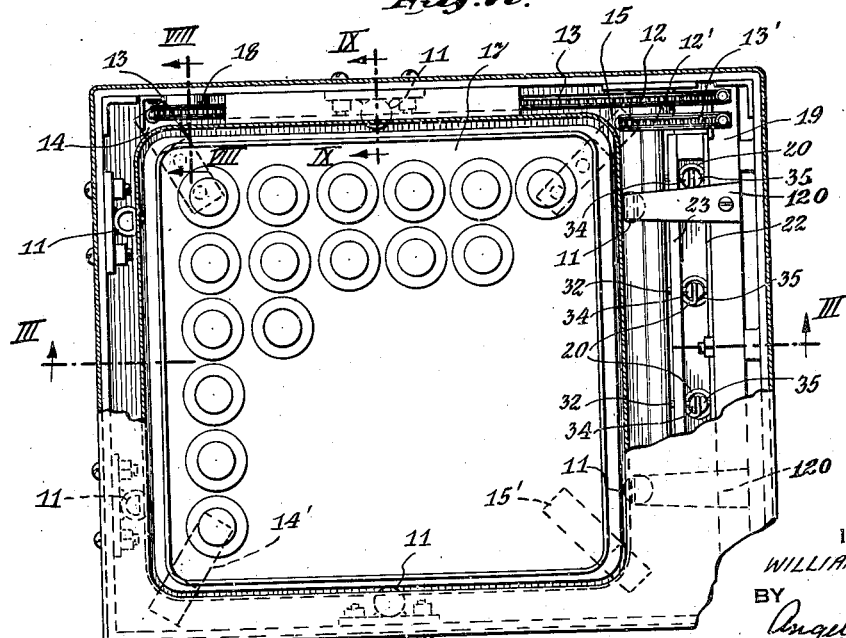
INVENTOR
WILLIAM J. GIBBS.
BY
Angelo M. Piarra
ATTORNEY Feb. 15, 1949.  W. J. GIBBS  2,461,638
APPARATUS FOR STORING AND DISPENSING STACKED ARTICLES
Filed Feb. 17, 1945   3 Sheets-Sheet 3

INVENTOR
WILLIAM J. GIBBS
BY
ATTORNEY

Patented Feb. 15, 1949

2,461,638

UNITED STATES PATENT OFFICE 2,461,638

APPARATUS FOR STORING AND DISPENSING STACKED ARTICLES

William J. Gibbs, Brooklyn, N. Y.

Application February 17, 1945, Serial No. 578,386

9 Claims. (Cl. 312—71)

The present invention relates to apparatus for storing and feeding superimposed articles, such as trays; dishes including plates, saucers, cups and the like; material in the process of manufacture and particularly to apparatus for automatically maintaining the top of superimposed material having uniform size and weight at a constant predetermined level. More particularly, it relates to improvements in unitary storage and dispensing apparatus of the general type shown and described in my Patent 2,251,874 issued August 5, 1941.

It is one of the objects of the invention among others to provide an improved apparatus for storing and delivering stacked articles in such position that the uppermost unit of the stack is presented for use at a predetermined convenient height and those below it are encased or held in protected position ready to be automatically fed upwardly upon removal of said uppermost member whereby the next member or unit beneath it comes automatically into position at said predetermined height and more particularly to adding counterweight masses to counterbalance the "head load" which includes the weight of the carrier and articles extending above the top of the dispensing apparatus to thereby relieve the load supporting springs used in such apparatus from supporting such "head load."

Further, the invention contemplates an apparatus adjustable for delivering stacked articles of different types, sizes and weight in order that the apparatus may be used for a variety of different articles capable of being stacked and a means to insure that the apparatus will always be in adjustment so that light loads are delivered at the same height as heavy loads with no injury to the apparatus as the load is placed on the apparatus or removed. Further the invention provides apparatus wherein the working parts are readily accessible from the exterior so that adjustments may be made without difficulty when a change is made in the stacked articles being stored and delivered. Still further objects are to provide an apparatus which is easy and simple of design; economical to manufacture; durable in operation; and an apparatus whose appearance is pleasing to the eye. Other objects will become apparent from the detailed description in conjunction with the drawing.

In carrying out the objects of the invention, there is provided an apparatus for storing and feeding stacked articles having a supporting frame with a carrier to hold stacked articles vertically movable within the supporting frame so that the uppermost of the stacked articles is at a predetermined level. There is a carrier supporting means within the supporting frame comprising sprockets and sprocket chains and a plurality of spring tensioning members attached in operative relation to the carrier supporting means with each spring tensioning member being calibrated to balance a certain weight with the plurality of spring tensioning members counterbalancing said carrier and any load thereon so that the uppermost stacked article will be freely presented at a predetermined level. The apparatus is adjustable for stacked articles of lesser weights by each spring tensioning member being separately detachable from operative relation with the carrier supporting means so the counterbalance provided by the spring tensioning members may be adjusted to counterbalance any lesser weight of stacked articles upon the carrier. The plurality of spring tensioning members have one end of the spring members attached to a cross bar or saddle member which cross bar is attached operatively with the sprocket chain, while the other end is attached to the supporting frame from which the spring members are detachable so as to render the spring tensioning members inoperative. A door in an enclosure for the supporting frame gives ready access to the spring tensioning members for attachment to or detachment from the supporting frame. The cross bar or saddle member has a pair of spaced members, between which the upper ends of the spring tensioning members extend and detachable pins pass through the spaced members and the spring ends to secure the springs to the cross-bar or saddle member which forms part of the carrier supporting means and counterbalancing elements are attached to the pin members and extend into the spring members. The invention will be better understood from the following detailed description having reference to the accompanying drawings wherein like reference numerals have been used to represent like parts throughout the several views and in which:

Figure 1 is a front and side elevational view of the improved apparatus of the invention.

Figure 2 is a top plan view of the improved apparatus with parts broken away and with some details of the enclosed mechanism shown in dotted lines.

Figure 3 is a vertical sectional view taken along the line III—III of Figure 2 and looking in the direction of the arrows.

Figure 6 is a sectional view taken along the line VI—VI of Figure 5 and looking in the direction of the arrows.

Figure 7 is an elevational view of the counterbalancing elements showing the elements separated somewhat.

Figure 8 is a sectional view taken along the line VIII—VIII of Figure 2 and looking in the direction of the arrows.

Figure 9 is a sectional view taken along the line IX—IX of Figure 2 and looking in the direction of the arrows.

Figure 4:
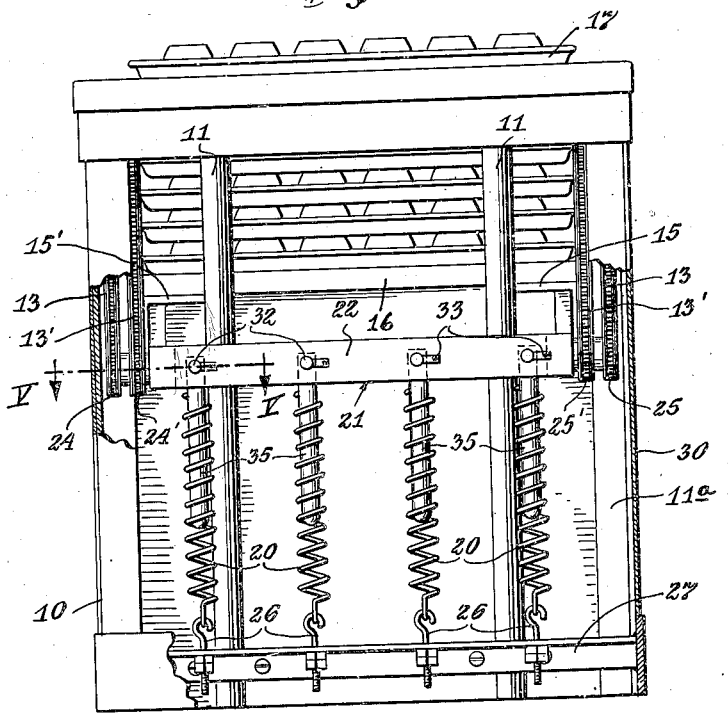
Figure 4 is an elevational view of the improved apparatus of the invention with the door open to get a view of the interior of the apparatus.
Figure 5:
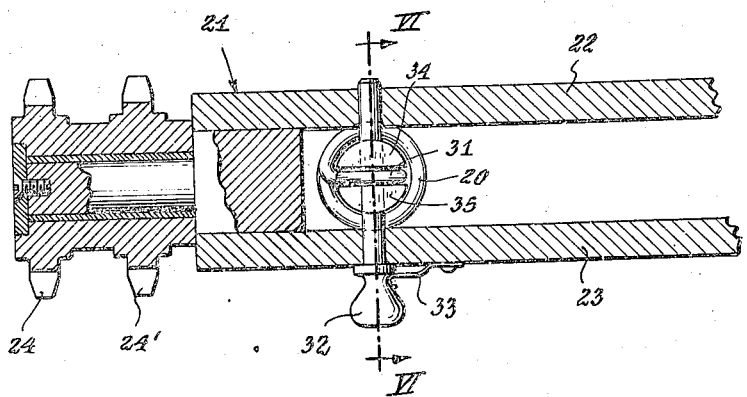
Figure 5 is a sectional view taken along the line V—V of Figure 4 and looking in the direction of the arrows.

Referring to the drawings, an enclosure or casing 10 encloses a supporting frame consisting of upright rods 11 fastened at their lower ends to a base portion 110 and secured to a top portion 115 at their upper ends. The top portion 115 carries shafts on which are mounted spaced pairs of sprockets, two of which are shown in Figure 2 at 12, 12' over which pass sprocket chains, two of which are shown at 13, 13' in Figure 2 which at their respective ends connect with the lugs 14, 14' and 15, 15', shown in dotted lines in Figure 2 which in turn support the four corners of carrier 16 which has trays 17 carrying dishes stacked thereon. At the other end of the supporting frame, the sprocket chains which pass to the lugs 14 and 14' pass over sprocket wheels carried by top portion 115, one of which sprockets is shown at 18 (Fig. 3). The other free end of the sprocket chains are anchored in a cross bar 19 which is secured to brackets 120 extending from certain rods 11 shown in Figures 3 and 4 and resting on upright bars 11a. The sprocket chains passing from sprocket wheel to sprocket wheel along the side of the apparatus such, as the sprocket chain 13 passing from the sprocket 12 to the sprocket 18, are supported midway of the side of the apparatus by a sprocket wheel 220 carried by the top portion 115, to prevent sagging of the sprocket chain as shown in Figure 9. The sprocket chains provide the support for the vertical movement of the carrier 16 in response to varying loads on the carrier 16. The description of the apparatus to this point is similar to the apparatus shown in Patent 2,251,874 issued August 5, 1941.

The improvement over the above mentioned patent resides in making the apparatus adjustable to care for different weighted articles on the carrier 16. The weight placed on the carrier 16 is transmitted through the sprocket chain members. Mounted to cooperate with the sprocket chain members are a plurality of spring tensioning members, which springs 20 are calibrated so that the addition or removal of one or more of said trays 17 to or from the stack results in a proportional lowering or raising of the said carrier 16 and its stacked trays 17 whereby the upper level of said stacked trays 17 is always at a substantially predetermined level with respect to the top of the apparatus. The lowering of the carrier 16 within the supporting frame is resisted by the springs 20 being placed under tension and as weight is removed from the carrier 16 the tensional force in the springs 20 will be reduced. It can thus be seen that the springs 20 act as a counterbalancing force for any weight placed on the carrier 16.

The tensional force in the springs 20 will depend wholly on the weight placed on the carrier 16. The four springs 20 are calibrated to support the heaviest load for which the apparatus is designed. If it is desired to use the apparatus for stacked articles of lighter weight, the tensional force of the springs 20 must be reduced before the same apparatus can serve for more than one type of stacked articles.

The springs 20 are mounted at their upper ends in a cross bar or saddle member 21 made up of spaced members 22 and 23 with sprockets 24, 24' and 25, 25' on either end of the cross bar over which the sprocket chains pass. The springs are detachably mounted at the other ends thereof on a series of hooks 26, which hooks 26 are secured to a bracket 27 rigidly secured in turn to the supporting frame 11. It can be seen that the cross bar or saddle member is freely floating within the casing in a vertical direction and is responsive to the weight placed on the carrier 16 through the sprocket chains and in turn transmits the force created by the weight on the carrier to the spring tensioning members where the force is stored up as a tension force within the springs.

It can further be seen that the sprockets, sprocket chains and cross bar or saddle member 21 provide supporting means for the carrier 16 within the supporting frame. If it is desired to place stacked articles of lesser weight on the carrier 16, the calibration on the spring tensioning members 20 is such that the springs 20 will resist the lighter weight; hence the carrier will not descend into the casing 10. One of the springs 20 can be detached from the hook 26 and be made inoperative to thus care for the lesser weight or 2 or 3 springs 20 may be disengaged depending upon the weight placed on the carrier 16. In this manner the apparatus can care for stacked articles of varying weights by disengaging one or more springs 20 from operative coaction with the carrier 16. When the dispenser is empty the springs 20 can be readily detached from the hooks 26 by exerting a slight downward pull at the lower end of the spring and then moving the lower end of the spring sideways a little until it is clear of the hook 26. The hook 26, which is adjusted to require a slight pull to be exerted on the spring to unhook the spring from the hook, is sufficient to prevent the springs from unhooking themselves when the dispenser is empty and also prevents the unhooked springs from rehooking themselves when the dispenser is empty or is moved about.

To make the apparatus susceptible of adjustment, the casing 10 has a door 30 in the front of the apparatus that can be opened and the springs 20 are readily accessible for attachment or detachment by an operator. Since the hooking and unhooking of the springs described above can be done within a few moments, the utility of this type of dispenser is very great since it can be quickly changed for carrying a load having one weight at one time and another load of a different weight at another time.

The upper ends of the springs 20 are bent as at 31 to provide a hook and a pin 32 passes through openings in the spaced walls 22 and 23 to hold the upper ends of the springs in assembled relation. A lock spring 33 holds the pin 32 against accidental disengagement. Mounted in the top of each spring member 20 are a pair of counterbalance elements 34 and 35 which have openings 36 and 37 through which the pin members 32 extend to hold the counterbalance elements assembled on the cross arm 21.

The counterbalance elements are of such weight that the "head load," consisting primarily of the carrier 16 and the initial load of a predetermined weight placed on the carrier, is counterbalanced thereby avoiding the necessity of stretching the spring to position the top of the initial load at a predetermined level. The springs 20 act as a housing for the counterweights and prevents them from swinging and damaging the dispenser when it is moved about. By making the counterweight inserted in each spring in a plurality of pieces such as shown in Figure 7, the weights can be readily inserted inside of the springs 20. The counterweights also assist in preventing injury to the springs should all the stacked articles be suddenly removed from the carrier 16.

It will thus be evident that I have accomplished my objective of making an improved self-leveling dispenser which avoids any necessity of using part of the calibrated springs rated capacity for positioning the "head load" and instead allows substantially the entire rated capacity of the spring to be used for supporting material added to the "head load" thereby always keeping the top of the material at a constant predetermined level.

It is thought the operation of the improved apparatus is fully understandable from the above description in conjunction with the drawings and no further description of the method of operation is needed. While the invention has been described in connection with a specific embodiment, it is to be understood that the words which have been used are words of description rather than of limitation, and that practice of the invention within the scope of the appended claims may be resorted to without departing from the true scope of the invention in all its aspects.

The invention above described may be varied in construction within the scope of the claims, for the particular device selected to illustrate the invention is but one of many possible embodiments of the same. The invention, therefore, is not to be restricted to the precise details of the structure shown and described.

I claim:

1. A storing and feeding apparatus comprising a frame, a carrier adapted to be moved vertically within said frame and to support a load of stacked articles with the uppermost article of the stack at a predetermined level, carrier supporting means, a plurality of spring tensioning members connected to said carrier supporting means and frame, and elongated vertically extending counterbalance elements connected to said carrier supporting means, and confined by said spring tensioning members to a vertical lengthwise path of travel, each spring tensioning member being calibrated to balance a certain weight, and said plurality of spring tensioning members and counterbalance elements collectively counterbalancing said carrier and a predetermined load of stacked uniform articles so that the uppermost articles in said stack will be maintained at a predetermined level.

2. A storing and feeding apparatus comprising a frame, a carrier adapted to be moved vertically within said frame and to support a load of stacked articles with the uppermost article of the stack at a predetermined level, carrier supporting means, a plurality of spring tensioning members connected to said carrier supporting means and frame, and elongated vertically extending counterbalance elements connected to said carrier supporting means and confined by said spring tensioning members to a vertical path of travel, each spring tensioning member being calibrated to balance a certain weight, and said plurality of spring tensioning members and counterbalance elements collectively counterbalancing said carrier and a predetermined load of stacked uniform articles so that the uppermost articles in said stack will be maintained at a predetermined level, said apparatus being adjustable for stacked articles of lesser weight by detaching the spring tensioning members from their operative relation to said carrier supporting means and frame whereby the counterbalance provided by the spring tensioning members may be adjusted to counterbalance a lesser weight of stacked articles upon the carrier.

3. A storing and feeding apparatus for stacked articles comprising a supporting frame, a carrier within said frame and adapted for vertical movement and to hold a load of stacked articles with the uppermost article at a predetermined level, carrier supporting means, a plurality of spring tensioning members having one end of each spring operatively attached to a portion of the carrier supporting means and the other end attached to the supporting frame, said portion of the carrier supporting means to which the one end of the spring tensioning members are attached comprising a pair of connected spaced members with the ends of the spring tensioning members therebetween, pins passing through the spaced members and bent spring ends to hold the springs to the carrier supporting means, each spring tensioning member being calibrated to balance a certain weight with the plurality of spring tensioning members counterbalancing said carrier and any load thereon so that the uppermost stacked articles will be freely presented at a predetermined level and said apparatus being adjustable for stacked articles of lesser weight by each spring tensioning member being separately detachable from operative relation with the carrier supporting means by detaching the end of the spring attached to the supporting frame so the counterbalance provided by the spring tensioning members may be adjusted to counterbalance any lesser weight of stacked articles upon the carrier.

4. A storing and feeding apparatus for stacked articles comprising a supporting frame, a carrier within said frame and adapted for vertical movement and to hold a load of stacked articles with the uppermost article at a predetermined level, carrier supporting means, a plurality of spring tensioning members having one end of each spring operatively attached to a portion of the carrier supporting means and the other end attached to the supporting frame, said portion of the carrier supporting means to which the one end of the spring tensioning members are attached comprising a pair of connected spaced members with the ends of the spring tensioning members therebetween, pins passing through the spaced members and bent spring ends to hold the springs to the carrier supporting means, pair of counterbalancing elements attached to the pins and extending within each spring member, each spring tensioning member being calibrated to balance a certain weight with the plurality of spring tensioning members counterbalancing said carrier and any load thereon so that the uppermost stacked article will be freely presented at a predetermined level and said apparatus being adjustable for stacked articles of lesser weight by each spring tensioning member being separately detachable from operative relation with the carrier supporting means by detaching the end of the spring attached to the supporting frame so the counterbalance provided by the spring tensioning members may be adjusted to counterbalance any lesser weight of stacked articles upon the carrier.

5. A storing and feeding apparatus comprising a frame, a carrier adapted to be moved vertically within said frame and to support a load of stacked articles with the uppermost article of the stack at a predetermined level, a plurality of flexible members connected to said frame and carrier and adapted to support said carrier, stationary members over which said flexible members are guided, and a vertically movable member resting upon and supported by the portions of said flexible members intermediate said stationary members and frame, tension springs connected to said vertically movable member and said frame, and counter-weights supported upon said vertically movable member and extending into said springs, said springs and counter-weights collectively counterbalancing said carrier and a predetermined load consisting of a stack of uniform articles to maintain the uppermost article of said stack at a predetermined level.

6. A storing and feeding apparatus comprising a frame, a carrier adapted to be moved vertically within said frame and to support a load of stacked articles with the uppermost article of the stack at a predetermined level, a plurality of flexible members connected to said frame and carrier and adapted to support said carrier, stationary members over which said flexible members are guided, and a vertically movable member resting upon and supported by the portions of said flexible members intermediate said stationary members and frame, tension springs connected to said vertically movable member and said frame, and counter-weights supported upon said vertically movable member, each of said counter-weights consisting of a pair of symmetrical pieces extending into said springs, said springs and counter-weights collectively counterbalancing said carrier and a predetermined load consisting of a stack of uniform articles to maintain the uppermost article of said stack at a predetermined level.

7. Apparatus for storing and dispensing material comprising a frame, a carrier for supporting material superimposed on said carrier, flexible members for supporting said carrier, a calibrated spring tension device associated with said flexible members for exterting a pull on said flexible members correlated with the weight supported on said carrier to maintain the top of the material superimposed on said carrier at a substantially constant predetermined level, said spring device being adapted and arranged not to be stretched more than approximately twice the length of the stretching portion of said device, and non-extensible elongated counterweight members associated with said flexible members and confined to lengthwise travel by said spring tension device to counterbalance the carrier and the weight of articles extending above the top of the platform.

8. Apparatus for storing and dispensing material comprising a frame, a carrier for supporting material superimposed on said carrier, elongated flexible members connected at one end to said carrier for raising and lowering the carrier and material superimposed thereon, connections securing the opposite end of said elongated flexible members to said frame, guide members over which a portion of said elongated members intermediate the ends thereof pass, a vertically movable member supported by a portion of said elongated members located between said guide members and the ends of the elongated members connected to said frame, calibrated tension springs connected at one end to said vertically movable member and at the other end to hooks mounted in said frame, said tension springs being constructed and arranged to be stretched a distance not more than approximately twice the length of their unstretched coils, non-extensible elongated counterweight members connected at one end to said vertically movable member and confined by said springs to lengthwise travel, said counterweight members having a weight sufficient to counterbalance the weight of the carrier and the initial amount of material superimposed thereon to maintain the top of said material at a constant predetermined level when the carrier is in its uppermost position.

9. Apparatus for storing and dispensing material comprising a frame, carrier reciprocable vertically with respect to said frame for supporting material superimposed on said carrier, elongated flexible members connected to and supporting said carrier, a plurality of calibrated tension springs connected at one end to said frame, a device for connecting the other end of said tension springs to said elongated flexible members to cause the top of the material supported on said carrier to be maintained at a constant predetermined level with respect to the top of said frame, a plurality of elongated weights suspended at the top of said springs and inside thereof to maintain the top of the initial quantity of material supported by said carrier at said constant predetermined level when said carrier is in its uppermost position.

WILLIAM J. GIBBS.

REFERENCES CITED

The following references are of record in the file of this patent:

UNITED STATES PATENTS

| Number | Name | Date |
| --- | --- | --- |
| 686,734 | Jaeger | Nov. 19, 1901 |
| 944,899 | Mullin | Dec. 28, 1909 |
| 2,251,874 | Gibbs | Aug. 5, 1941 |
| 2,373,029 | Kiesling | Apr. 3, 1945 |